United States Patent
Yamane

(10) Patent No.: US 11,729,482 B2
(45) Date of Patent: Aug. 15, 2023

(54) DUST-PROOF MEMBER, IMAGING MODULE, AND IMAGING APPARATUS

(71) Applicant: Shigemasa Yamane, Kanagawa (JP)

(72) Inventor: Shigemasa Yamane, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 144 days.

(21) Appl. No.: 17/432,949

(22) PCT Filed: Mar. 18, 2020

(86) PCT No.: PCT/JP2020/012147
§ 371 (c)(1),
(2) Date: Aug. 23, 2021

(87) PCT Pub. No.: WO2020/189744
PCT Pub. Date: Sep. 24, 2020

(65) Prior Publication Data
US 2022/0038612 A1    Feb. 3, 2022

(30) Foreign Application Priority Data

Mar. 20, 2019 (JP) ................................. 2019-053876
Mar. 12, 2020 (JP) ................................. 2020-042913

(51) Int. Cl.
*H04N 23/52* (2023.01)
*H04N 23/51* (2023.01)

(52) U.S. Cl.
CPC ............. *H04N 23/52* (2023.01); *H04N 23/51* (2023.01)

(58) Field of Classification Search
CPC ......... G03B 17/56; H04N 23/51; H04N 23/52
See application file for complete search history.

(56) References Cited

U.S. PATENT DOCUMENTS

2006/0245050 A1\* 11/2006 Uchida ............. H01L 27/14618
359/391
2011/0150461 A1    6/2011 Hase
2013/0235458 A1    9/2013 Kawai
(Continued)

FOREIGN PATENT DOCUMENTS

CN         103309129 A    9/2013
EP           3035099 A1    6/2016
(Continued)

OTHER PUBLICATIONS

International Search Report dated May 18, 2020 in PCT/JP2020/012147 filed on Mar. 18, 2020, 10 pages.
(Continued)

*Primary Examiner* — Amy R Hsu
(74) *Attorney, Agent, or Firm* — Xsensus LLP

(57) ABSTRACT

A dust-proof member includes a base portion, a protruding portion. The base portion has a hollow shape. The protruding portion includes an elastic member and arranged so as to protrude from the base portion in a direction opposite to a mounting direction when the base portion is mounted on a mounting portion of a housing. A contact surface portion of the base portion has an inclination from an inner circumferential end portion to an outer circumferential portion, the contact surface portion coming in contact with the mounting portion of the housing.

9 Claims, 7 Drawing Sheets

(56) References Cited

U.S. PATENT DOCUMENTS

| | | | |
|---|---|---|---|
| 2016/0006958 A1 | 1/2016 | Iwamatsu | |
| 2016/0191899 A1* | 6/2016 | Ohsumi | B60R 11/04 348/46 |
| 2019/0103716 A1* | 4/2019 | Yamazaki | H01R 13/743 |
| 2019/0124241 A1* | 4/2019 | Suzuki | G02B 7/023 |

FOREIGN PATENT DOCUMENTS

| | | |
|---|---|---|
| JP | 2001-275023 | 10/2001 |
| JP | 2006-100878 | 4/2006 |
| JP | 2008-131397 | 6/2008 |
| JP | 2012-023718 A | 2/2012 |
| JP | 2012-029114 | 2/2012 |
| JP | 6133988 | 5/2017 |

OTHER PUBLICATIONS

Office Action dated May 11, 2022 in Chinese Patent Application No. 202080021933.2, 17 pages.

* cited by examiner

[Fig. 1]
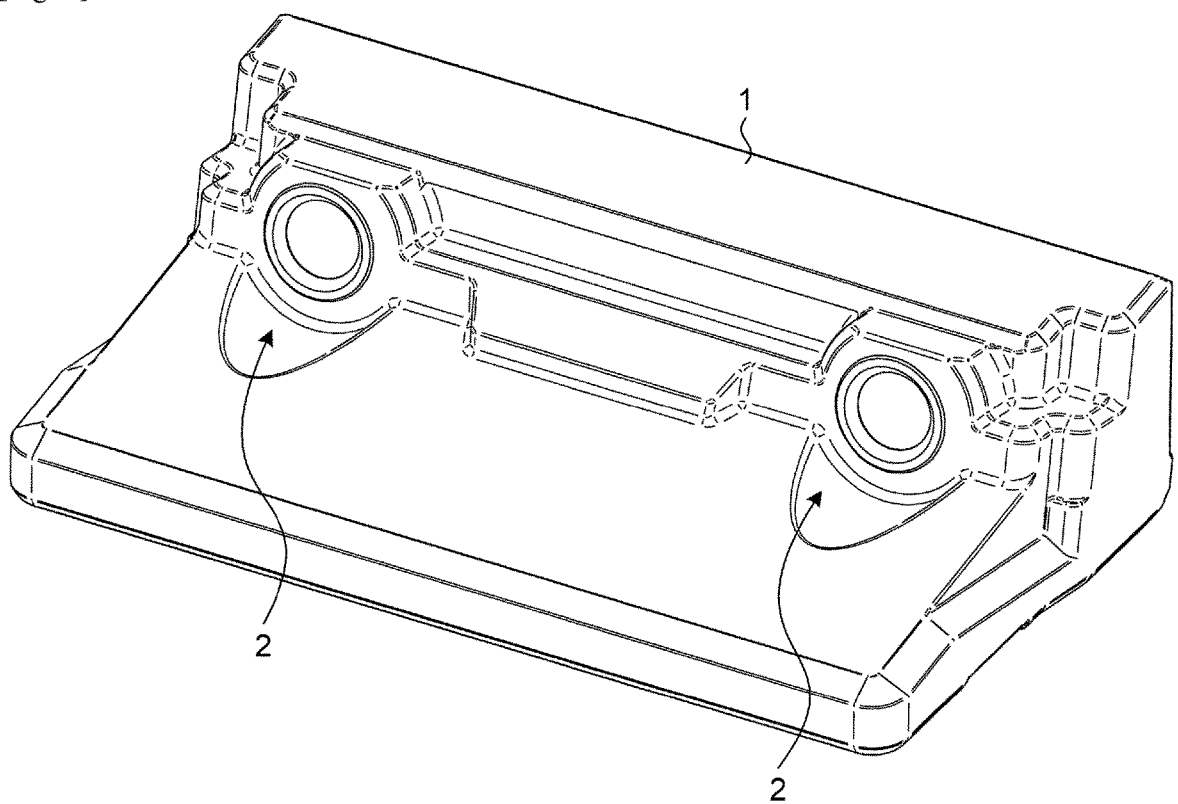

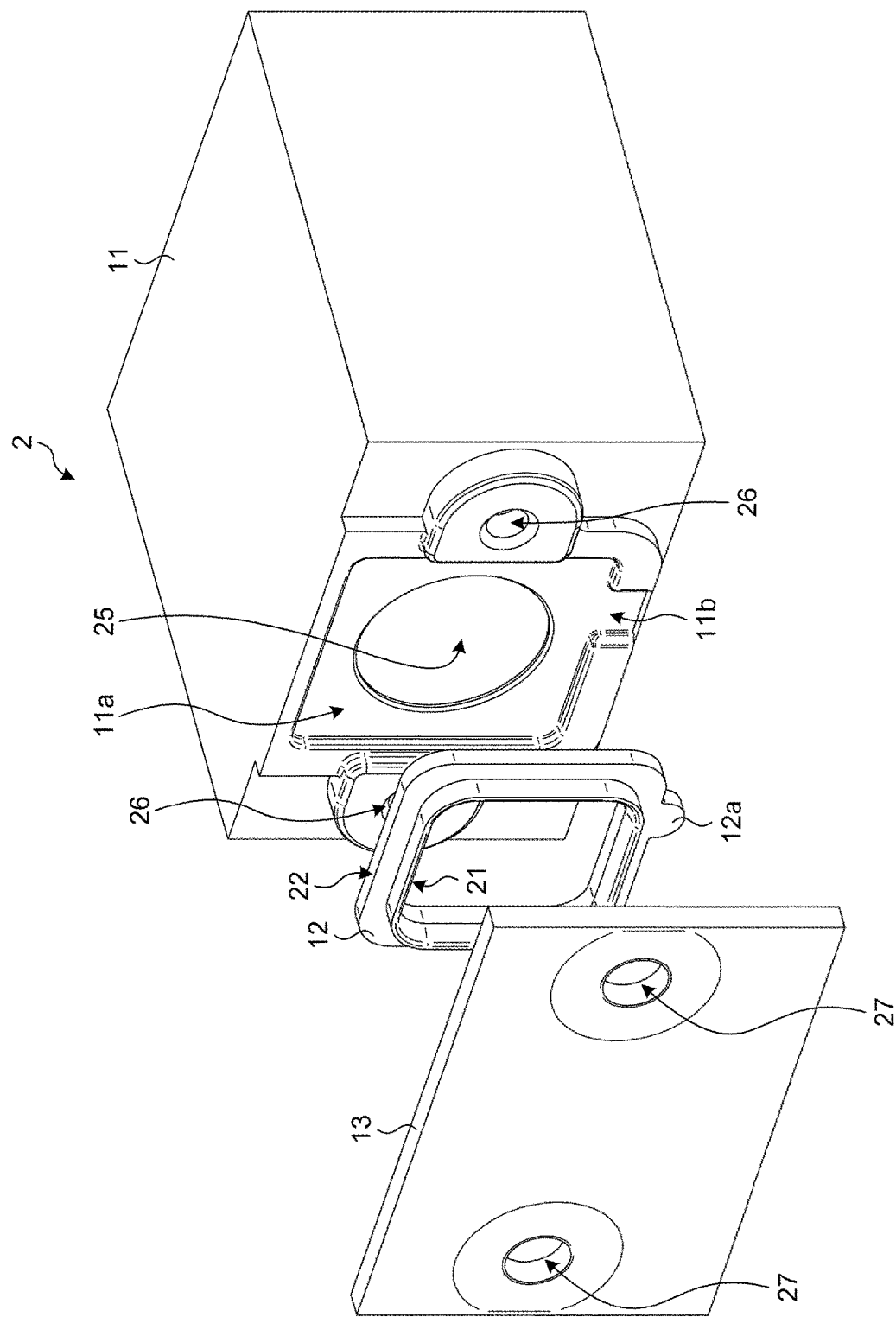

[Fig. 3A]
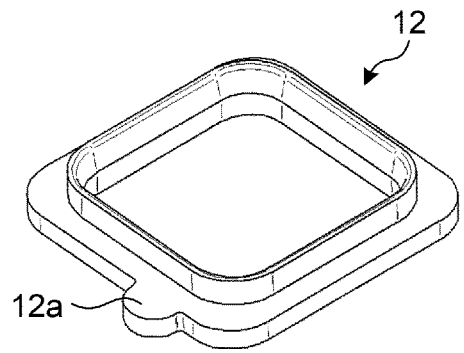
[Fig. 3B]
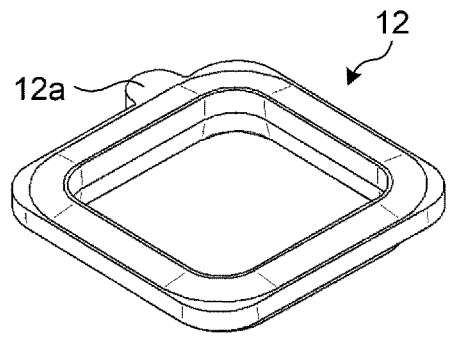
[Fig. 3C]
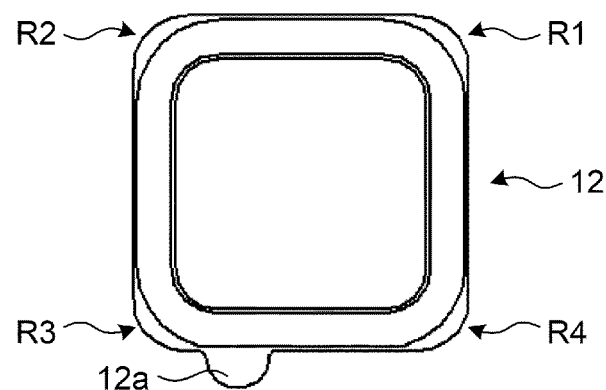
[Fig. 4A]
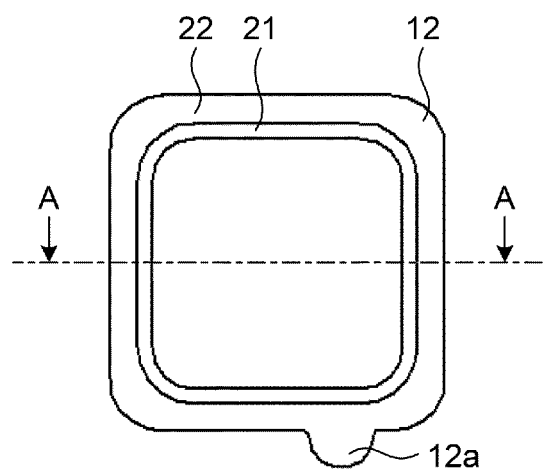

[Fig. 4B]
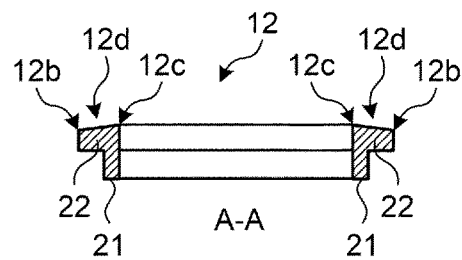
[Fig. 4C]
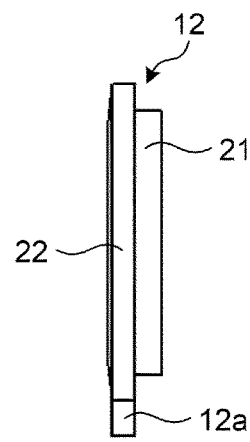
[Fig. 4D]
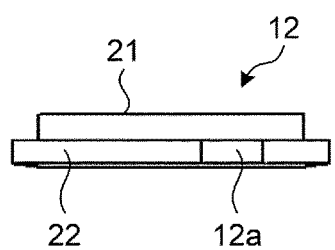
[Fig. 5]
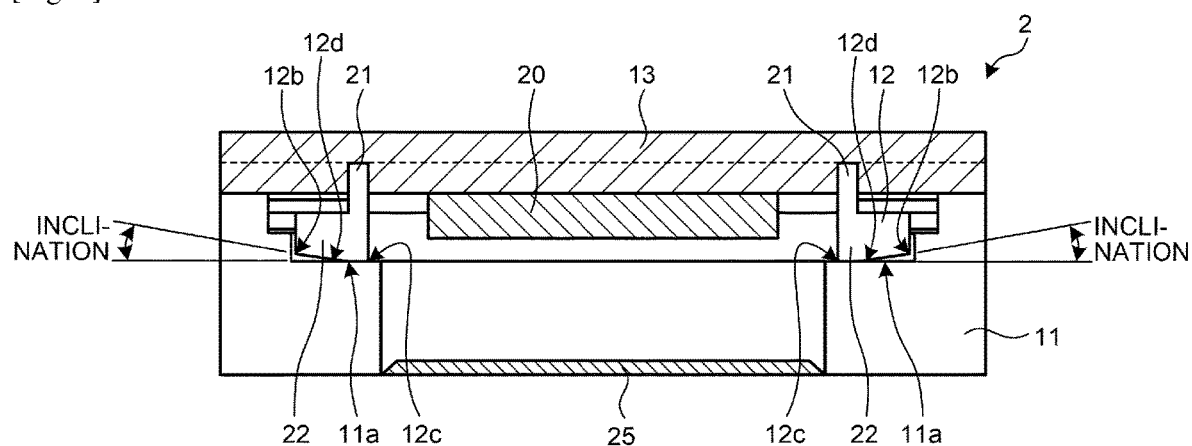

[Fig. 6]
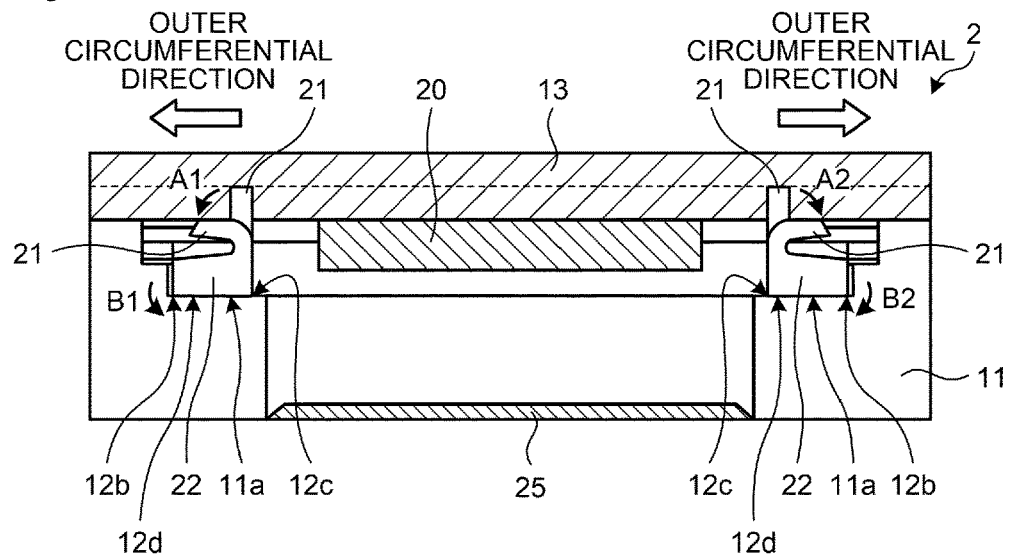
[Fig. 7]
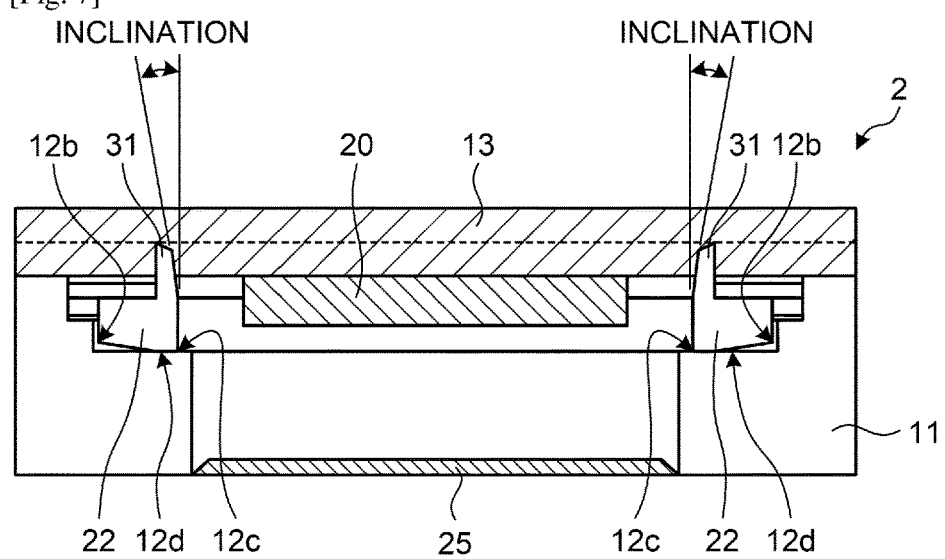
[Fig. 8]
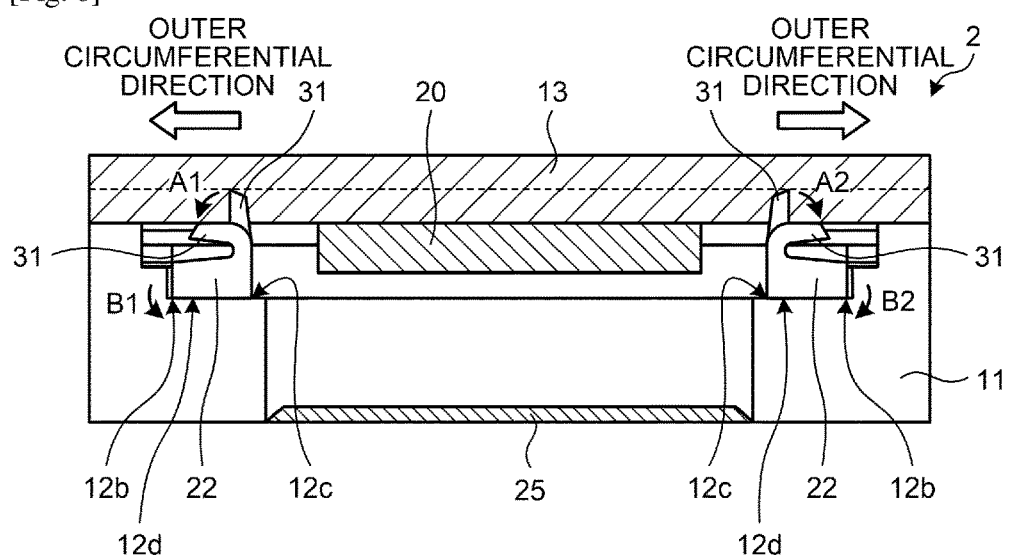

[Fig. 9A]
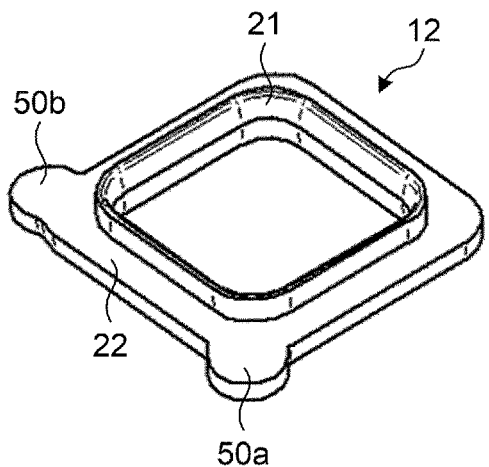
[Fig. 9B]
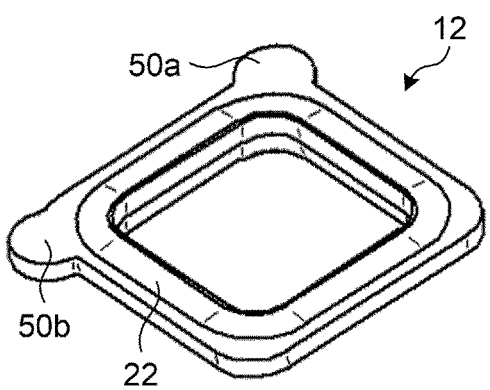
[Fig. 10A]
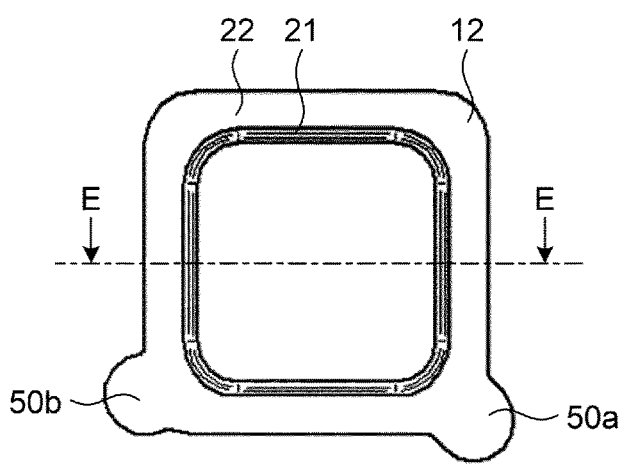
[Fig. 10B]
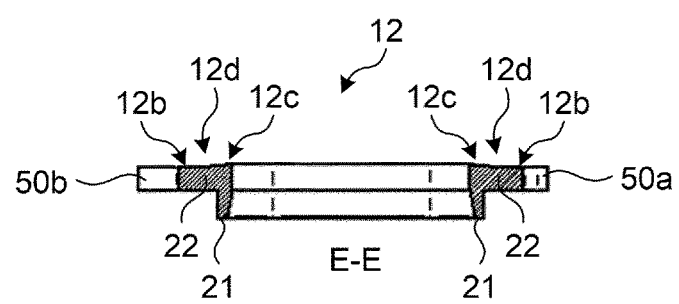

[Fig. 10C]
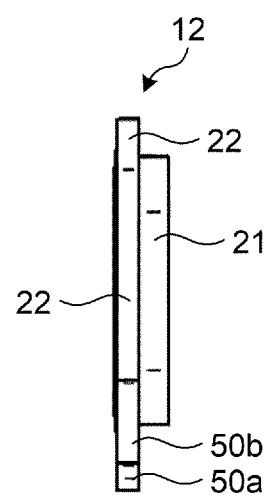
[Fig. 10D]
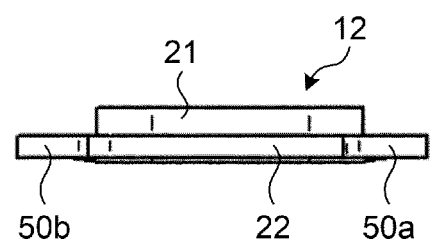

DUST-PROOF MEMBER, IMAGING MODULE, AND IMAGING APPARATUS

CROSS-REFERENCE TO RELATED APPLICATIONS

The present application is based on PCT filing PCT/JP2020/012147, filed Mar. 18, 2020, which claims priority to JP 2019-053876, filed Mar. 20, 2019 and JP 2020-042913, filed Mar. 12, 2020, the entire contents of each are incorporated herein by reference.

TECHNICAL FIELD

The present invention relates to a dust-proof member, an imaging module, and an imaging apparatus.

BACKGROUND ART

Patent Literature 1 (Japanese Laid-open Patent Publication No. 2001-275023) discloses an imaging element dust-proof structure for a video camera. The imaging element dust-proof structure for the video camera is a dust-proof structure that allows an imaging element to form, via an optical filter, an object image captured by an imaging lens and that includes an elastic dust-proof member interposed between the optical filter and the imaging element. The dust-proof member has an opening for forming the object image that has passed through the optical filter onto the imaging element. Further, an inclined surface that is inclined inward by a predetermined angle or more with respect to a line parallel to an optical axis is disposed on an optical filter side of the opening. The inclined surface prevents reflected light of incident light that has passed through the optical filter from entering the imaging element. With this configuration, the dust-proof member prevents occurrence of flare or ghost due to internal reflection.

SUMMARY OF INVENTION

Technical Problem

Here, a case will be described in which an imaging module is assembled in such a manner that the dust-proof member is brought into contact with a substrate to improve dust-proof performance. In this case, if a contact part of the dust-proof member is brought into close contact with the substrate, the contact part falls inward or outward so that the substrate and the dust-proof member come into close contact with each other. When the dust-proof member is brought into contact with the substrate, it is desirable that the contact part falls outward and comes into close contact with the substrate because this can further improve the dust-proof performance. Therefore, this is adopted as a design concept.

However, the imaging module is not always assembled in such a manner that the contact part of the dust-proof member falls outward. Therefore, it is often the case that the assembled imaging module does not have dust-proof performance that matches the design concept, and it is extremely difficult to assemble the imaging module with dust-proof performance that matches the design concept.

The present invention has been conceived in view of the foregoing situations, and an object of the present invention is to provide a dust-proof member, an imaging module, and an imaging apparatus capable of easily assembling an imaging module with dust-proof performance.

Solution to Problem

According to an aspect of the present invention, a dust-proof member includes a base portion, a protruding portion. The base portion has a hollow shape. The protruding portion includes an elastic member and arranged so as to protrude from the base portion in a direction opposite to a mounting direction when the base portion is mounted on a mounting portion of a housing. A contact surface portion of the base portion has an inclination from an inner circumferential end portion to an outer circumferential portion, the contact surface portion coming in contact with the mounting portion of the housing.

Advantageous Effects of Invention

According to an aspect of the present invention, it is possible to easily assemble an imaging module with dust-proof performance.

BRIEF DESCRIPTION OF DRAWINGS

FIG. 1 is a perspective view illustrating an external appearance of a stereo camera device of a first embodiment.

FIG. 2 is an exploded perspective view of an imaging module mounted on the stereo camera device of the first embodiment.

FIG. 3A is a perspective view of a dust-proof member.
FIG. 3B is a perspective view of the dust-proof member.
FIG. 3C is a bottom view of the dust-proof member.
FIG. 4A is a diagram illustrating a top surface of the dust-proof member.
FIG. 4B is a diagram illustrating an A-A cross-section of the dust-proof member.
FIG. 4C is a diagram illustrating a side surface of the dust-proof member.
FIG. 4D is a diagram illustrating a front surface of the dust-proof member.
FIG. 5 is a cross-sectional view of a main part of a housing on which the dust-proof member and an imaging element substrate are mounted in the stereo camera device of the first embodiment.
FIG. 6 is a cross-sectional view of a main part of the imaging module of the stereo camera device of the first embodiment.
FIG. 7 is a cross-sectional view of a main part of a housing on which a dust-proof member and an imaging element substrate are mounted in a stereo camera device of a second embodiment.
FIG. 8 is a cross-sectional view of a main part of the imaging module after the stereo camera device of the second embodiment is assembled.
FIG. 9A is a perspective view of a dust-proof member mounted on a stereo camera device of a third embodiment.
FIG. 9B is a perspective view of the dust-proof member mounted on the stereo camera device of the third embodiment.
FIG. 10A is a diagram illustrating a top surface of a dust-proof member 12 mounted on the stereo camera device of the third embodiment.
FIG. 10B is a diagram illustrating an E-E cross-section of the dust-proof member 12 mounted on the stereo camera device of the third embodiment.
FIG. 10C is a diagram illustrating a side surface of the dust-proof member 12 mounted on the stereo camera device of the third embodiment.

FIG. 10D is a diagram illustrating a front surface of the dust-proof member 12 mounted on the stereo camera device of the third embodiment.

DESCRIPTION OF EMBODIMENTS

Embodiments of a stereo camera device will be described below with reference to the accompanying drawings.

First Embodiment

External Configuration of Stereo Camera Device

FIG. 1 is a perspective view illustrating an external appearance of a stereo camera device 1 of a first embodiment. As merely one example, the stereo camera device 1 of the first embodiment as illustrated in FIG. 1 is what is called an in-vehicle camera, and causes each of imaging modules 2 for a right eye and a left eye to capture a vehicle front image (and a vehicle rear image etc.) while a vehicle is running and stopped. Imaging information as described above is used to, for example, recognize a running lane and a vehicle ahead, detect an inter-vehicle distance to the vehicle ahead, and detect an obstacle and a sign.

External Configuration of Imaging Module

FIG. 2 is an exploded perspective view of the imaging module 2. As illustrated in FIG. 2, the imaging module 2 includes a housing 11, a dust-proof member 12, and an imaging element substrate 13. A lens 25 that acquires imaging light is arranged at a substantially center position on one side portion of the housing 11.

In the vicinity of the lens 25, a mounting portion 11a for the dust-proof member 12 is arranged, where the mounting portion 11a has a quadrilateral shape for which four corner portions are subjected to processing treatment so as to be rounded. A positioning hole portion 11b to which a picking portion 12a of the dust-proof member 12 is fitted is arranged in the mounting portion 11a. The picking portion 12a of the dust-proof member 12 is arranged so as to protrude toward an outer circumference side from one side portion of the dust-proof member 12. Further, the picking portion 12a of the dust-proof member 12 is arranged at a position deviated from a center position of the one side portion of the dust-proof member 12. In the example illustrated in FIG. 2, the picking portion 12a is arranged at a position deviated rightward from the center position of the one side portion of the dust-proof member 12.

The dust-proof member 12 is arranged in the mounting portion 11a such that the picking portion 12a is fitted to the positioning hole portion 11b. The picking portion 12a of the dust-proof member 12 is arranged rightward on the one side portion of the dust-proof member 12, and therefore, if the dust-proof member 12 is mounted on the mounting portion 11a upside down, the picking portion 12a is not fitted to the positioning hole portion 11b. Therefore, when the dust-proof member 12 is to be mounted on the mounting portion 11a, it is necessary to mount the dust-proof member 12 on the mounting portion 11a such that the entire dust-proof member 12 is mounted on the mounting portion 11a and the picking portion 12a of the dust-proof member 12 is fitted to the positioning hole portion 11b. Therefore, by arranging the above-described picking portion 12a in the dust-proof member 12, the picking portion 12a functions as a positioning member, so that it is possible to accurately determine the position of the dust-proof member 12 and mount the dust-proof member 12 on the mounting portion 11a of the housing 11.

If the dust-proof member 12 is mounted on the mounting portion 11a of the housing 11, the imaging element substrate 13 is arranged so as to cover the dust-proof member 12 from above and press the dust-proof member 12 in an optical axis direction. The imaging element substrate 13 is fixed to the housing 11 with screws via two screw insertion holes 27 and two screw holes 26 of the housing 11 while pressing the dust-proof member 12. An imaging element (denoted by a reference numeral 20 in FIG. 5) is arranged on a surface facing the dust-proof member 12 in the imaging element substrate 13. By mounting the dust-proof member 12 on the mounting portion 11a of the housing 11, the dust-proof member 12 comes into close contact with the imaging element substrate 13 while surrounding the imaging element. With this configuration, it is possible to prevent foreign particles or the like from entering the optical system.

Configuration of Dust-Proof Member

FIG. 3 is a perspective view and a bottom view of the dust-proof member 12. Specifically, FIG. 3A is a perspective view of a top surface of the dust-proof member 12 viewed from an obliquely upper left direction. FIG. 3B is a perspective view of a bottom surface of the dust-proof member 12 viewed from an obliquely upper left direction. FIG. 3C is a bottom view of the dust-proof member 12. Further, FIGS. 4A to 4D are diagrams illustrating the top surface, a side surface, a front surface, and an A-A cross-section of the dust-proof member 12. Specifically, FIG. 4A is a top view of the dust-proof member 12. FIG. 4B is a cross-sectional view of the dust-proof member cut along a line A-A and viewed in an arrow direction. FIG. 4C is a left side view of the dust-proof member 12. FIG. 4D is a front view of the dust-proof member 12.

As illustrated in FIGS. 3A to 4D, the dust-proof member 12 is made with an elastic member, such as silicone rubber. As one example, as illustrated in FIG. 3C, the dust-proof member 12 has a shape (a shape with predetermined rounded portions) subjected to processing treatment such that each of corner portions R1 to R4 of a base portion 22 and a protruding portion 21, all of which have square shapes, is rounded. Further, the hardness of the elastic member forming the dust-proof member 12 is preferably about 30±5 degrees, for example. When the dust-proof member 12 is made of a silicone rubber, the hardness of the silicone rubber is measured using the tool called "durometer" specified in Japanese Industrial Standard (JIS), and the specified test piece is measured according to the specified measuring method. Then, the dust-proof member 12 is made of a silicone rubber that has been determined to have the foregoing hardness by the foregoing measurement.

Meanwhile, the dust-proof member 12 may be formed into a circular shape, an elliptical shape, or the like. By forming the dust-proof member 12 into the shape with large rounded portions, it is possible to prevent buckling from occurring in the dust-proof member 12 when the dust-proof member 12 is pressed by the imaging element substrate 13, so that it is possible to simplify assembly of the imaging module 2. It is preferable that the protruding portion 21 of the dust-proof member 12 is pressed to expand toward the outer circumferential side, and thus the shape of the dust-proof member 12 is most preferably the circular shape facilitating deformation, and is next preferably an elliptical shape or an oval shape in order of preference. Meanwhile, the "circular shape" herein includes a nearly circular shape such as an elliptical shape and an oval shape, as well as a circular shape.

As illustrated in FIG. 3A and FIG. 4A to FIG. 4C, the protruding portion 21 is arranged on the dust-proof member 12 so as to stand at a right angle from the base portion 22 that has a hollow shape. In other words, the protruding portion 21 is arranged on the dust-proof member 12 so as to extend an inner circumference of the base portion 22 and so as to stand at a right angle with respect to the base portion 22. Further, the picking portion 12a is arranged on one side portion of the base portion 22 so as to protrude from the side portion.

A cross-section of the protruding portion 21 and the base portion 22 has an "L-shape" as illustrated in FIG. 4B. Further, the base portion 22 is formed such that a thickness is reduced from a corner portion 12c on the inner circumference side to a corner portion 12b on the outer circumference side.

In other words, a contact surface portion 12d that is a part of the base portion 22 and that comes into contact with the mounting portion 11a of the housing 11 is inclined from an inner circumferential end portion to an outer circumferential end portion such that an area of contact with the mounting portion 11a after being pressed via the protruding portion 21 becomes larger than an area of contact with the mounting portion 11a before being pressed via the protruding portion 21. A region of contact between the base portion 22 and the mounting portion 11a after the being pressed is extended to the outer circumference side relative to a region of contact between the base portion 22 and the mounting portion 11a before the being pressing. Further, although it is only an example, the inclination of the base portion 22 of the contact surface portion 12d is about 5 to 10 degrees.

As will be described later, through the processing treatment, when the dust-proof member 12 is mounted on the mounting portion 11a of the housing 11, in the contact surface portion 12d of the base portion 22, a portion near the corner portion 12c on the inner circumference side comes in contact with the mounting portion 11a and a portion near the corner portion 12b on the outer circumference side is separated from the mounting portion 11a.

In other words, because of the inclination of the contact surface portion 12d of the base portion 22, a gap portion corresponding to the inclination from the corner portion 12c on the inner circumference side to the corner portion 12b on the outer circumference side is formed between the contact surface portion 12d of the base portion 22 of the dust-proof member 12 and the mounting portion 11a of the housing 11. Meanwhile, the thickness of the base portion need not always be reduced toward the corner portion on the outer circumference side as long as the portion near the corner portion 12b on the outer circumference side is separated from the mounting portion 11a. In other words, an upper part of the contact surface portion 12d may be inclined and may eventually have the same thickness.

Process of Assembling Imaging Module

The dust-proof member 12 as described above is mounted on the mounting portion 11a such that the picking portion 12a is fitted to the positioning hole portion 11b of the housing 11 as illustrated in FIG. 2. As described above, the picking portion 12a of the dust-proof member 12 is arranged at a position deviated from the center position of one side portion. Therefore, if the dust-proof member 12 is mounted on the mounting portion 11a upside down, the position of the picking portion 12a is located opposite to the position of the positioning hole portion 11b, so that it becomes difficult to fit the picking portion 12a and the mounting portion 11a to each other. Accordingly, it is possible to allow a person who assembles the imaging module 2 to recognize that the dust-proof member 12 is arranged upside down, so that it is possible to easily and accurately perform assembly.

Whether the dust-proof member 12 is accurately mounted on the mounting portion 11a is determined based on a captured image that is obtained by capturing an image of the dust-proof member 12 mounted on the mounting portion 11a from directly above. Therefore, by arranging the protruding portion 21 such that the protruding portion 21 stands at a right angle from the base portion 22, an observer is able to easily check whether a foreign matter is present or not from directly above without inclining the dust-proof member 12 at the time of inspection of an exterior.

In this example, it is assumed that the protruding portion 21 is arranged so as to stand at a right angle from the base portion 22. However, it is satisfactory that the entire base portion 22 can be observed as described above, and therefore, the protruding portion 21 may be inclined in an inner circumferential direction (toward the inner circumferential side) of the dust-proof member 12 in which the base portion 22 is exposed. With this configuration, it is possible to achieve the same effects as described above.

Subsequently, the imaging element substrate 13 is fixed to the housing 11 with screws so as to cover, from above, the dust-proof member 12 mounted on the mounting portion 11a as described above. Accordingly, the dust-proof member 12 is pressed in the optical axis direction by the imaging element substrate 13.

FIG. 5 illustrates a cross-sectional view of a main part of the housing 11 on which the dust-proof member 12 and the imaging element substrate 13 are mounted. As described above, because of the inclination of the base portion 22, the gap portion corresponding to the inclination from the corner portion 12c on the inner circumferential side of the dust-proof member 12 to the corner portion 12b on the outer circumferential side is formed between the contact surface portion 12d of the base portion 22 of the dust-proof member 12 and the mounting portion 11a of the housing 11. In this state, if a pressing force is applied from the imaging element substrate 13 to the dust-proof member 12, the gap portion corresponding to the above-described inclination is gradually reduced, so that the entire contact surface portion 12d of the base portion 22 of the dust-proof member 12 comes into contact with the mounting portion 11a.

In other words, with application of the pressing force from the imaging element substrate 13 to the dust-proof member 12, the contact surface portion 12d of the base portion 22 gradually comes into contact with the mounting portion 11a from the inner circumferential side to the outer circumferential side, so that the base portion 22 is inclined toward the outer circumferential side as indicated by an arrow B1 and an arrow B2 in FIG. 6. With the inclination of the base portion 22, the protruding portion 21 is also inclined toward the outer circumferential side as indicated by an arrow A1 and an arrow A2 in FIG. 6, so that the dust-proof member 12 comes into close contact with the imaging element substrate 13 such that the entire protruding portion 21 is stretched out and press-folded toward the outer circumferential side as illustrated in FIG. 6. Accordingly, a circumference of the imaging element 20 arranged on the imaging element substrate 13 is surrounded by the dust-proof member 12 that comes into close contact with the imaging element substrate 13, and the dust-proof member 12 prevents foreign particles or the like from entering the optical system.

Meanwhile, the protruding portion 21 can be made easy to expand toward the outer circumferential side by performing processing such as surface texturing for increasing slipperiness on the edge of the protruding portion 21.

Meanwhile, the corner portion 12b on the outer circumferential side of the contact surface portion 12d of the base portion 22 is illustrated to be angular (illustrated to be linear) in FIGS. 5, 6, etc., but may have a C chamfer plane shape to form no angular portion, or have a shape having large roundness. The interference at the time of contact can be reduced by increasing R (radius regarding roundness of the corner) of the corner portions 12b.

Effects of First Embodiment

As is clear from the above description, in the stereo camera device 1 of the first embodiment, the base portion of the dust-proof member 12 is formed so as to be inclined toward the outer circumferential side when the dust-proof member 12 is pressed. With this configuration, if a pressing force is applied from the imaging element substrate 13 to the dust-proof member 12, the base portion 22 is inclined toward the outer circumference side and the protruding portion 21 is also inclined toward the outer circumferential side, so that the dust-proof member 12 comes into close contact with the imaging element substrate 13 such that the entire protruding portion 21 is stretched out and press-folded toward the outer circumferential side.

In other words, by applying a force when the imaging element substrate 13 is mounted on the housing 11, it is possible to assemble the imaging module 2 such that the entire protruding portion 21 of the dust-proof member 12 comes into close contact with the imaging element substrate 13 while being inclined toward the outer circumferential side. Therefore, it is possible to easily assemble the imaging module 2 with dust-proof performance that matches the design concept.

Furthermore, it is possible to bring the protruding portion 21 into close contact with the imaging element substrate 13 such that the entire protruding portion 21 is inclined toward the outer circumferential side, so that it is possible to reduce a load applied from the dust-proof member 12 to the imaging element substrate 13. Therefore, it is possible to prevent damage of the imaging element substrate 13 and occurrence of solder crack in the imaging element substrate 13 due to an increase in the load.

Moreover, if the protruding portion 21 has a shape with less-rounded portions, the dust-proof member 12 and the imaging element substrate 13 are assembled on the housing 11 such that what is called a buckling phenomenon is caused to occur, i.e., such that when the imaging element substrate 13 is pressed, the protruding portion 21 is not deformed until a certain force is applied, but "deflection" occurs when the applied force reaches a certain level or more (buckling weight). It is possible to ensure desirable dust-proof performance of the protruding portion 21 by deflecting the protruding portion 21 toward the outer circumferential side; however, if the imaging module is assembled while causing buckling to occur in the dust-proof member 12, a deflection direction of the protruding portion 21 is unstable and it becomes difficult to obtain stable dust-proof performance.

In contrast, the stereo camera device 1 of the first embodiment is processed so as to have a circular shape or a shape with rounded corner portions. Therefore, it is possible to easily and uniformly apply weight to the dust-proof member 12, so that it is possible to deflect the protruding portion 21 toward the outer circumferential side. Consequently, it is possible to obtain stable dust-proof performance.

Second Embodiment

A stereo camera device according to a second embodiment will be described below. The stereo camera device of the second embodiment is one example in which, in addition to the configuration of the stereo camera device of the first embodiment as described above, a protruding portion of the dust-proof member 12 is formed into a tapered shape that is inclined from the inner circumferential side to the outer circumferential side such that the protruding portion can more easily fall toward the outer circumferential side. The second embodiment to be described below is different from the first embodiment as described above only in this point. Therefore, only the difference between the embodiments will be described below, and the same explanation will not be repeated.

Specifically, FIG. 7 is a cross-sectional view of an imaging module mounted on the stereo camera device of the second embodiment. In the stereo camera device of the second embodiment, as illustrated in FIG. 7, the base portion 22 of the dust-proof member 12 has inclination and a protruding portion 31 also has inclination. In other words, the protruding portion 31 has a tapered shape that is inclined from the inner circumferential side to the outer circumferential side.

With this configuration, when the imaging element substrate 13 is pressed against the dust-proof member 12 at the time of assembly, the base portion 22 is inclined toward the outer circumferential side due the the pressing force as indicated by an arrow B1 and an arrow B2 in FIG. 8. With the inclination of the base portion 22, the protruding portion 31 is also inclined toward the outer circumferential side. Then, the imaging element substrate 13 comes into contact with an inner side of the protruding portion 31, so that the protruding portion 31 is stretched out and press-folded toward the outer circumferential side as indicated by an arrow A1 and an arrow A2 in FIG. 8 and comes into close contact with the imaging element substrate 13.

Meanwhile, the corner portion 12b on the outer circumferential side of the contact surface portion 12d of the base portion 22 is illustrated to be angular (illustrated to be linear) in FIGS. 7, 8, etc., but may have a C chamfer plane shape to form no angular portion, or have a shape having large roundness. The interference at the time of contact can be reduced by increasing R (radius regarding roundness of the corner) of the corner portions 12b.

In the stereo camera device of the second embodiment, both of the base portion 22 and the protruding portion 31 of the dust-proof member 12 have inclination, so that it is possible to more easily bend the protruding portion 31 of the dust-proof member 12 toward the outer circumferential side. Therefore, it is possible to more easily assemble the imaging module 2 with the dust-proof performance that matches the design concept, and it is also possible to achieve the same effects as those of the first embodiment as described above.

Third Embodiment

A stereo camera device according to a third embodiment will be described below. The stereo camera device of the third embodiment is one example in which, in addition to the configuration of the stereo camera device of the first embodiment as described above, two picking portions are arranged as the picking portion of the dust-proof member 12. The third embodiment to be described below is different from each of the embodiments as described above only in this point. Therefore, only the difference between the embodiments will be described below, and the same explanation will not be repeated.

FIG. 9 is a perspective view the dust-proof member 12 mounted on the stereo camera device of the third embodiment. Specifically, FIG. 9A is a perspective view of a top surface of the dust-proof member 12 viewed from an obliquely upper left direction. FIG. 9B is a perspective view of a bottom surface of the dust-proof member 12 viewed from an obliquely upper left direction. In addition, FIG. 10 is a diagram illustrating the top surface, a side surface, a front surface, and an A-A cross-section of the dust-proof member 12 mounted on the stereo camera device of the third embodiment. Specifically, FIG. 10A is a top view of the dust-proof member 12. FIG. 10B is a cross-sectional view of the dust-proof member cut along a line A-A and viewed in an arrow direction. FIG. 10C is a left side view of the dust-proof member 12. FIG. 10D is a front view of the dust-proof member 12.

As illustrated in FIG. 9A, FIG. 9B, and FIG. 10A to FIG. 10D, in the third embodiment, two picking portions 50a and 50b are arranged in the dust-proof member 12. As one example, the two picking portions 50a and 50b are arranged on one side portion of the dust-proof member 12 such that the two picking portions 50a and 50b are separated from each other by a predetermined distance. In this example, the two picking portions 50a and 50b are arranged so as to protrude from right and left corner portions of the one side portion of the dust-proof member 12.

In the third embodiment, because the picking portions 50a and 50b are arranged, a positioning hole portion for the picking portion 50a and a positioning hole portion for the picking portion 50b are arranged in the mounting portion 11a of the dust-proof member.

As one example, the picking portion 50a that is arranged so as to protrude from the right corner portion between the two picking portions 50a and 50b functions as the picking portion 50a for a right-hander. Similarly, the picking portion 50b that is arranged so as to protrude from the left corner portion functions as the picking portion 50b for a left-hander. With this configuration, regardless of whether the worker is right-handed or left-handed, it is possible to easily pick up the dust-proof member 12 via the picking portion 50a or the picking portion 50b, so that it is possible to easily perform assembly operation of the stereo camera device. Further, the stereo camera device of the third embodiment is able to achieve the same effects as those of the above-described embodiments.

While the two picking portions 50a and 50b are arranged in the example of the third embodiment, it may be possible to arrange four picking portions protruding from four corners of the dust-proof member 12, or it may be possible to arrange three picking portions protruding from any three corner portions. In each case, it is possible to more easily pick up the dust-proof member 12, so that it is possible to more easily perform assembly operation of the stereo camera device.

The embodiments of the present invention have been described above; however, the above embodiments are presented as examples, and there is no intension to limit the scope of the invention. The novel embodiments may be implemented as other various embodiments, and various omission, replacement, and modification are possible without departing from the spirit of the invention. For example, while the stereo camera device has been described as an application example of the present invention in the embodiments described above, the present invention may be applied to a monocular camera. Even in this case, it is possible to achieve the same effects as those of the embodiments. Furthermore, the embodiments and their modifications are included in the scope and spirit of the invention, and they are included in the scope of the invention described in claims and their equivalents.

REFERENCE SIGNS LIST

1 Stereo camera device
2 Imaging module
11 Housing of imaging module
11a Mounting portion of dust-proof member
11b Positioning hole portion of picking portion of dust-proof member
12 Dust-proof member
12a Picking portion of dust-proof member
12b Outer circumferential end portion of base portion of dust-proof member
12c Inner circumferential end portion of base portion of dust-proof member
12d Contact surface portion of base portion of dust-proof member
13 Imaging element substrate
21 Protruding portion
22 Base portion
50a Picking portion of dust-proof member
50b Picking portion of dust-proof member

CITATION LIST

Patent Literature

PTL 1: Japanese Laid-open Patent Publication No. 2001-275023

The invention claimed is:

1. A dust-proof member comprising:
a base having a hollow shape; and
a protruding structure comprising an elastic structure and arranged so as to protrude from the base in a direction opposite to a mounting direction when the base is mounted on a mounting structure of a housing, wherein
a contact surface of the base has an inclination from an inner circumferential end to an outer circumferential end, the contact surface coming in contact with the mounting structure of the housing,
wherein the base has a picking structure protruding toward an outer circumferential side, arranged at a position deviated from a center position, and fitted to a positioning hole of the mounting structure.

2. The dust-proof member according to claim 1, wherein the contact surface of the base has the inclination from the inner circumferential end to the outer circumferential end such that an area of contact with the mounting structure after being pressed via the protruding structure becomes larger than an area of contact with the mounting structure before being pressed via the protruding structure.

3. The dust-proof member according to claim 2, wherein the base is configured such that a region of contact with the mounting structure after the being pressed is extended to an outer circumferential side relative to a region of contact with the mounting structure before the being pressing.

4. The dust-proof member according to claim 1, wherein the protruding structure is arranged on the base such that the protruding structure stands from the base at a right angle or the protruding structure stands from the base so as to be inclined toward an inner circumferential side of the base.

5. The dust-proof member according to claim 1, wherein the protruding structure has a tapered shape so as to be inclined from an inner circumferential side to an outer circumferential side.

6. The dust-proof member according to claim 1, wherein at least the protruding structure out of the base and the protruding structure is formed into one of a circular shape and a shape with rounded corner portions.

7. The dust-proof member according to claim 1, wherein the inclination of the contact surface of the base is 5 to 10 degrees.

8. An imaging module comprising:
the dust-proof member according to claim 1;
the mounting structure of the housing on which the dust-proof member is mounted;

an imaging structure substrate fixed to the housing while pressing the protruding structure of the dust-proof member mounted on the mounting structure of the housing; and an imaging structure arranged at a position on the imaging structure substrate so as to be surrounded by the dust-proof member when the imaging structure substrate is fixed to the housing.

9. An imaging apparatus comprising:

one or more imaging modules each corresponding to the imaging module according to claim 8.

* * * * *